(12) United States Patent
Carruesco Llorens et al.

(10) Patent No.: US 10,589,509 B2
(45) Date of Patent: Mar. 17, 2020

(54) REPRESENTING AN OBJECT IN TERMS OF SUB-VOLUMES

(71) Applicant: Hewlett-Packard Development Company, L.P., Houston, TX (US)

(72) Inventors: Alex Carruesco Llorens, Sant Cugat del Valles (ES); Sergio Puigardeu Aramendia, Sant Cugat del Valles (ES); Lluis Abello Rosello, Sant Cugat del Valles (ES); Sergio Gonzalez, Sant Cugat del Valles (ES); Alvar Vinacua, Sant Cugat del Valles (ES); Pere Brunet, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 453 days.

(21) Appl. No.: 15/415,567

(22) Filed: Jan. 25, 2017

(65) Prior Publication Data

US 2018/0210943 A1 Jul. 26, 2018

(51) Int. Cl.
*B33Y 30/00* (2015.01)
*B33Y 10/00* (2015.01)
*B33Y 50/02* (2015.01)
*G06T 17/00* (2006.01)

(52) U.S. Cl.
CPC ............... *B33Y 30/00* (2014.12); *B33Y 10/00* (2014.12); *B33Y 50/02* (2014.12); *G06T 17/00* (2013.01); *G05B 2219/49008* (2013.01); *G05B 2219/49013* (2013.01)

(58) Field of Classification Search
None
See application file for complete search history.

(56) References Cited

U.S. PATENT DOCUMENTS

| | | | |
|---|---|---|---|
| 6,963,671 B2 | 11/2005 | Frisken et al. | |
| 7,242,401 B2 * | 7/2007 | Yang | G06T 15/08 345/420 |
| 10,137,646 B2 * | 11/2018 | Stevens | B29C 64/386 |
| 2005/0285858 A1 * | 12/2005 | Yang | G06T 15/08 345/420 |

(Continued)

OTHER PUBLICATIONS

"A Flexible Multi-Volume Shader Framework for Arbitrarily Intersecting Multi-Resolution Datasets", by John Plate, Thorsten Holtkaemper, and Bernd Froehlich, IEEE Transactions on Visualization and Computer Graphics, vol. 13, No. 6, Nov./Dec. 2007, pp. 1584-1591. (Year: 2007).*

(Continued)

*Primary Examiner* — James A Thompson
(74) *Attorney, Agent, or Firm* — HP Inc. Patent Department

(57) ABSTRACT

In an example, a method includes receiving, at a processor, data representing a three dimensional object. Using the processor, a modified data representation of the three dimensional object may be determined wherein, in the modified data representation, the three dimensional object is represented in terms of homogenous sub-volumes. Each homogenous sub-volume is homogenous with respect to a predetermined attribute and contains locations which are within a common object boundary distance band of plurality of object boundary distance bands, wherein at least two object boundary distance bands partially overlap.

20 Claims, 4 Drawing Sheets

(56) References Cited

U.S. PATENT DOCUMENTS

| | | | | |
|---|---|---|---|---|
| 2010/0085357 A1* | 4/2010 | Sullivan | ............... | G06T 15/06 |
| | | | | 345/420 |
| 2014/0172377 A1 | 6/2014 | Taubin et al. | | |
| 2017/0015057 A1* | 1/2017 | Stevens | ............... | B29C 64/386 |
| 2019/0039368 A1* | 2/2019 | Zeng | ............... | B29C 64/386 |

OTHER PUBLICATIONS

"New Computational Complexity Analysis for a Spatial Segmentation Algorithm", by Dumitru Dan Burdescu, Marius Brezovan, Liana Stanescu, Cosmin Stoica Spahiu , Science and Information Conference 2014, Aug. 27-29, 2014, pp. 355-363. (Year: 2014).*
Frisken, S. F. et al., "Designing with Distance Fields", GRAPH International Conference on Computer Graphics and Interactive Interactive Techniques, Jul. 30, 2006, pp. 60-66.

\* cited by examiner

REPRESENTING AN OBJECT IN TERMS OF SUB-VOLUMES

BACKGROUND

Additive manufacturing techniques may generate a three dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

Data relating to a three dimensional object to be generated may be provided to an additive manufacturing apparatus and used to generate the three dimensional object.

BRIEF DESCRIPTION OF DRAWINGS

Non-limiting examples will now be described with reference to the accompanying drawings, in which.

DETAILED DESCRIPTION

Additive manufacturing techniques may generate a three dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied.

In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three dimensional object to be generated (which may for example be generated from structural design data). The fusing agent may have a composition which absorbs energy such that, when energy (for example, heat) is applied to the layer, the build material coalesces and solidifies to form a slice of the three dimensional object in accordance with the pattern. In other examples, coalescence may be achieved in some other manner. A coalescence modifying agent (also referred to as modifying or detailing agents), which acts to modify the effects of a fusing agent for example by reducing or increasing coalescence or to assist in producing a particular finish or appearance to an object, and such agents may therefore be termed detailing agents may also be used as a print agent in some examples. A coloring agent, for example comprising a dye or colorant, may in some examples be used as a fusing agent or a modifying agent, and/or as a print agent to provide a particular color for the object.

Additive manufacturing systems may generate objects based on structural design data. This may involve a designer generating a three dimensional model of an object to be generated, for example using a computer aided design (CAD) application. The model may define the solid portions of the object. To generate a three dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
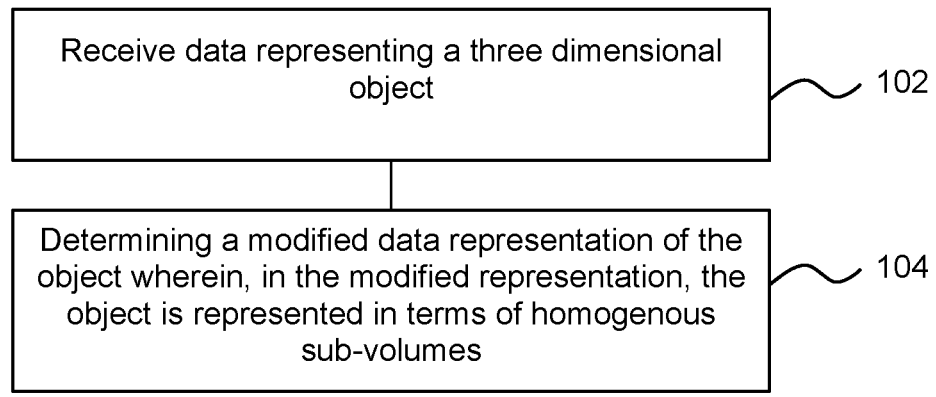
FIG. 1 is a flowchart of an example method of modifying data representing a three dimensional object.

FIG. 1 is a flowchart of a method, which may be a computer implemented method, comprising, in block 102 receiving, at a processor, data representing a three dimensional object. The data may be for use in additive manufacturing, for example for use in generating the object represented thereby.

The data may for example comprises a data file, such as a STL file, an OBJ file, a DXF file, a json file, a 3mf file, a vtk file, or the like. In some examples, the object may be represented in a series of slices. In some examples, this data may comprise a representation of the solid portions of an object, and/or may for example comprise a 'wire mesh' (e.g. a polygon mesh) representation of the object. In some examples, the representation may comprise a print resolution representation of the data, for example comprising a specification of at least one attribute (for example, present or absent, a color, a texture, a transparency, a conductivity, a strength, a porosity, a resilience, or the like) or print material (for example, a choice of print agent or build material) for each 'voxel' of an object and/or a surrounding volume (for example, a cuboid enclosing the object). A voxel may be thought of as a volumetric pixel, and each voxel may correspond to a print addressable area. In some examples, voxels are defined at the print resolution of an apparatus. In some examples, each voxel is the same shape and/or size, for example comprising cubes or the same size, whereas in other examples voxels may differ in size and/or shape.

Block 104 comprises determining, using the processor, a modified data representation of the object wherein, in the modified representation, the object is represented in terms of homogenous sub-volumes. The term 'homogenous sub-volume' as used herein means that:

(i) each homogenous sub-volume is homogenous with respect to a predetermined attribute; and (ii) each homogenous sub-volume contains locations which are within a common object boundary distance band of plurality of object boundary distance bands. The object boundary is any inner or outer surface. In some examples, the distance to the object boundary may be defined as the distance from a location to the closest point on the object's surface. In other words, the distance to the object boundary may relate to the depth of a point within the object, as taken from the nearest surface to that point. These distances may be categorised into bands, as described in greater detail below, each band spanning a range of object boundary distances. However, in this example, at least two of the object boundary distance bands at least partially overlap, for example towards one or both edges thereof. As such, particular location (for example, a point or a voxel) which is in the region of the overlap may be selected to be in one of two object boundary distance bands when forming sub-volumes.

Such selection may be carried out in order to provide a relatively compact modified data representation (i.e. a data representation which occupies a relatively small amount of computer memory and/or data transmission resource). The object boundary distance bands may be predetermined as is further described below.

In some examples, the sub-volumes may be cuboids, tetrahedrons; pyramids, triangular prisms or the like. In some examples the locations may be point locations. In other examples, the locations may comprise volumes such as cuboids, tetrahedrons; pyramids, triangular prisms or the like. In some example, the locations comprise voxels, for example at the smallest resolution to which an object is described.

Figure 2:
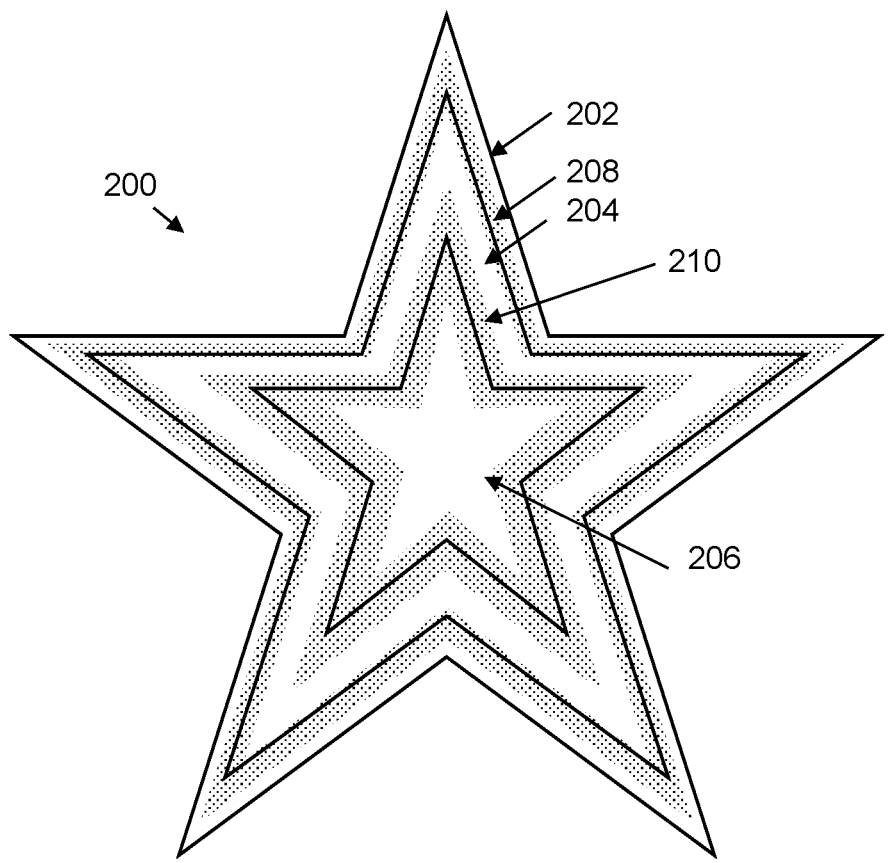
FIG. 2 is a schematic drawing illustrating an example of object boundary distance bands.

The overlaps between object distance boundary bands is illustrated schematically in FIG. 2. FIG. 2 shows a cross section of an example arbitrary object 200. Within the object, three object boundary distance bands are defined. There is an outer band 202, which is close to the object boundary (i.e. any surface of the object), a middle band 204 and an inner band 206. The middle band 204 partially overlaps the outer band 202 with a first overlap 208 (shown as a shaded region) and partially overlaps the inner band 206 with a second overlap 210 (also shown as a shaded region).

In an example, an outer band may for example comprise all object regions within 1 mm of the surface. The inner band may comprise all object regions between 1 and 5 mm from a surface and the inner band may comprise all object regions which are more than 5 mm from the surface.

In additive manufacturing, the depth of a location within the object or the distance of a location outside an object (i.e. the location's object boundary distance) can affect the processing applied at that location. For example, in cases where fusing agent is applied to a layer of build material, manufacturing parameters may be established such that inner portions of the object may have less fusing agent applied thereto than outer portions. This recognises that inner portions may be heated by surrounding areas, whereas such heating will be less in outer portions. Therefore, for a given amount of applied fusing agent, inner portions may be hotter than outer, or surface, portions. In some examples, a fusion reduction agent can also be applied in the inner portions to avoid excessive heat diffusing to upper layers, or may be applied to or beyond outer surfaces to stop or reduce heat propagation outside the object. In another example, a substructure, for example, a lattice formation, may be applied to inner regions, for example to provide physical characteristics such as a weight, density, buoyancy, resilience or the like. The substructure may be applied up to a predetermined depth, for example such that it is not visible from the surface, or such that a surface of an intended strength or completeness may be formed. The form of such a substructure may vary with depth. As another example, the appearance of inner portions may be considered differently to the appearance of outer portions. However, in some examples, a subsurface color may be used, for example to produce a particular color in a translucent surface, or to increase a color gamut of a surface color.

As a result, one factor which it may be helpful to record in data representing a three dimensional object to be manufactured in an additive manufacturing process is the object boundary distance of a location. However, it may be the case that the object boundary distance of the location need not be determined exactly (or, in the case of a voxel representation, depth is not generally recorded exactly as each voxel spans a region): the depth may be categorised into bands 202, 204, 206, which may be treated in a substantially consistent manner during object manufacture.

As may be noted, the bands 202, 204, 206 in FIG. 2 become increasing wide. While this need not be the case, it may be that the parameters to be used in manufacture tend to be more stable toward the inner portions of the object, whereas a difference between how a surface location and a near-surface location are manufactured may be more pronounced (e.g. the rate of change of manufacturing parameters may reduce as the object depth (or more generally, the distance from an object boundary) increases).

The definition of the bands may therefore be based on a physical behaviour and/or an appearance factor. However, there may be some flexibility in how the bands are defined. For example, the band boundaries may not themselves mark a step change in behaviour/appearance, instead marking a point on a continuum. Therefore, the presence of an overlap, and hence a choice of which band locations within the overlap region may belong to, may not result in a significant difference in a manufactured object.

There may be any number of object bands. In one example, there may be a predetermined number of depths defined in an object (for example, for ease of computation, 256 levels from 0 to 255), and these levels may be divided between bands. For example there may be seven bands defined as follows:

| Band number | Depth value range |
| --- | --- |
| 0 | 0-4 |
| 1 | 3-10 |
| 2 | 8-20 |
| 3 | 15-40 |
| 4 | 29-80 |
| 5 | 57-160 |
| 6 | 112-255 |

It may be noted that, although this need not be the case in all examples, in this example both the band size and the overlap increases with depth. For example, the first band spans 4 depth levels and overlaps with the next band by one depth level. However, the $6^{th}$ band (band 5) spans 103 depth levels and has an overlap of 23 depth levels with the previous band and 48 depth levels with the next band. The absolute size of each band depends on the size of the object. These figures are given by way of example: in other examples, different numbers of bands, a different depth resolution, different band sizes and different band overlaps may be employed.

In other examples, two bands may overlap, while other bands may not. For example, it may be the case that a process would benefit from having some bands which are defined precisely. For example, there may be a particular thickness for a layer which is intended to have a particular quality (e.g. strength, color depth, conductivity or resistance, provision of an active compound, or the like). Such a band may be determined or specified with no overlap with any neighbouring band, or no overlap on at least one side of the band. While this may result in an increase in the number of sub-volumes formed, this may be acceptable to achieve an intended result.

Figure 3A:
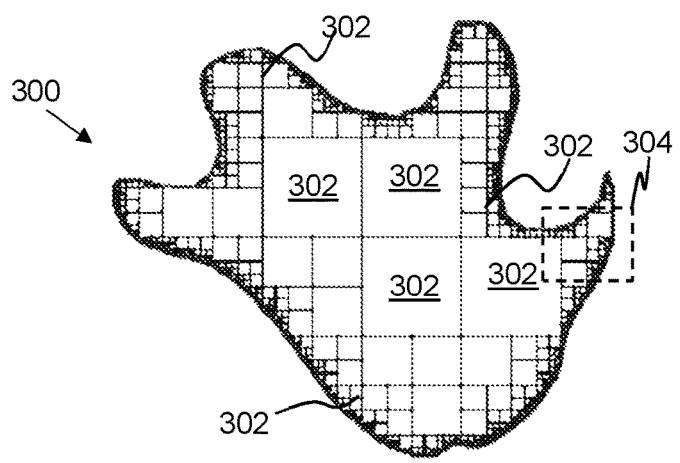
FIGS. 3A-3C are schematic drawings illustrating examples of sub-volumes which are homogenous with respect to a predetermined attribute.

FIG. 3A shows examples in which regions of an object 300 which are homogenous with respect to an attribute are categorised into sub-volumes 302 (just some of which are marked to avoid overcomplicating the Figure, however, each square region comprises a sub-volume 302). In this example, the attribute is whether the sub-volume is entirely internal to an object. Sub-volumes may (as in this example) have the same shape (in the example of the Figures, cuboid, shown in cross-section as a square), but differ in size. In the example of the Figures, set of sub-volumes which correspond to an 'octree' representation are formed. In such a representation there may be a minimum size cube (which may be a voxel, and/or in the case of a model for use in additive manufacturing may be defined at the print resolution of an apparatus, or may be at the highest resolution with which the object is represented). Each cube may provide a location in original data representing a three dimensional object from which a modified data representation is to be determined. A set of eight cubes which are identical with respect to an attribute may be merged to form a larger cube, and this process may continue until an object is characterised by a compact (in some examples, minimised) number of cubic sub-volumes, which vary in size. In the example of FIG. 3A, the sub-volumes are of the largest size possible given that they are entirely internal to the object 300.

Figure 3B:
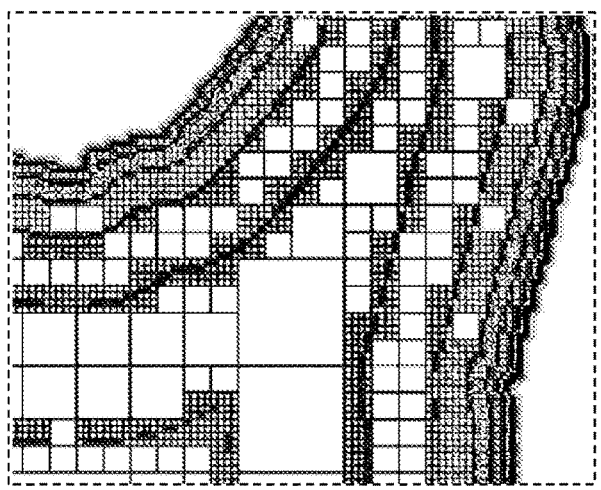

It may be noted that, as each sub-volume is associated with a range of depths, the depth thereof cannot be characterised with a single indication. Therefore, while such an object representation may be efficient in terms of storage, it does not lend itself well to storing depth information. The model may be adapted to include depth information, for example a sub-volume may be characterised as belonging to a particular object boundary distance band. However, some of the sub-volumes 302 shown in FIG. 3A are large and may span more than one band. As such, inserting a border indicating the edge of an object boundary distance band may mean that sub-volumes 302 which would otherwise be homogenous are now made up of dissimilar locations, with some locations being in a different band to another location. This effect is shown in FIG. 3B, which considers a region 304 of the object shown in FIG. 3A. The number of sub-volumes shown is increased by the introduction of bands (shown by borders as bold lines).

Figure 3C:
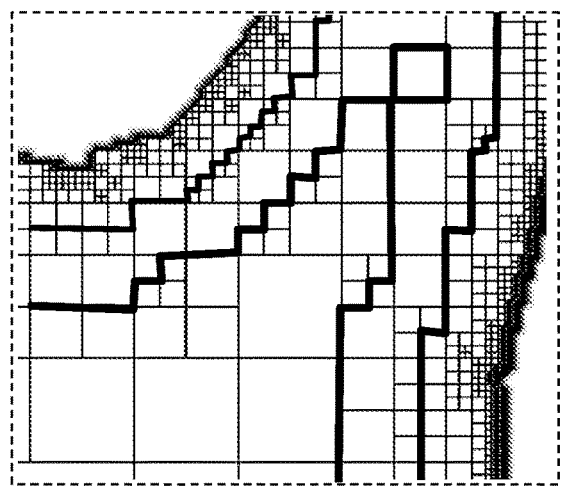

However, by including an overlap in the bands, and allowing a selection between bands where a location (for example, a point or a voxel) falls in the overlap, the number of sub-divisions of sub-volumes due to classification into an object boundary distance band may be reduced: where a location is within an overlap between object boundary distance bands, the categorising may comprise categorising the location to an object boundary distance band in order to increase the size of at least one homogenous sub-volume. Viewed another way, where a location is within an overlap between object boundary distance bands, the categorising may comprise categorising the location to an object boundary distance band in order to reduce a number of homogenous sub-volumes within the object (where the reduction is compared to the number of homogenous sub-volumes which would be formed if the location was categorised as belonging to the other possibly applicable object boundary distance band). This is shown in FIG. 3C, which contains more defined sub-volumes in the region 304 than are shown in FIG. 3A, but fewer than are shown in FIG. 3B.

In other examples, other attributes, or combinations of attributes, may be considered such that, for example, object regions having the same combination of predetermined attributes are considered homogenous.

Figure 4:
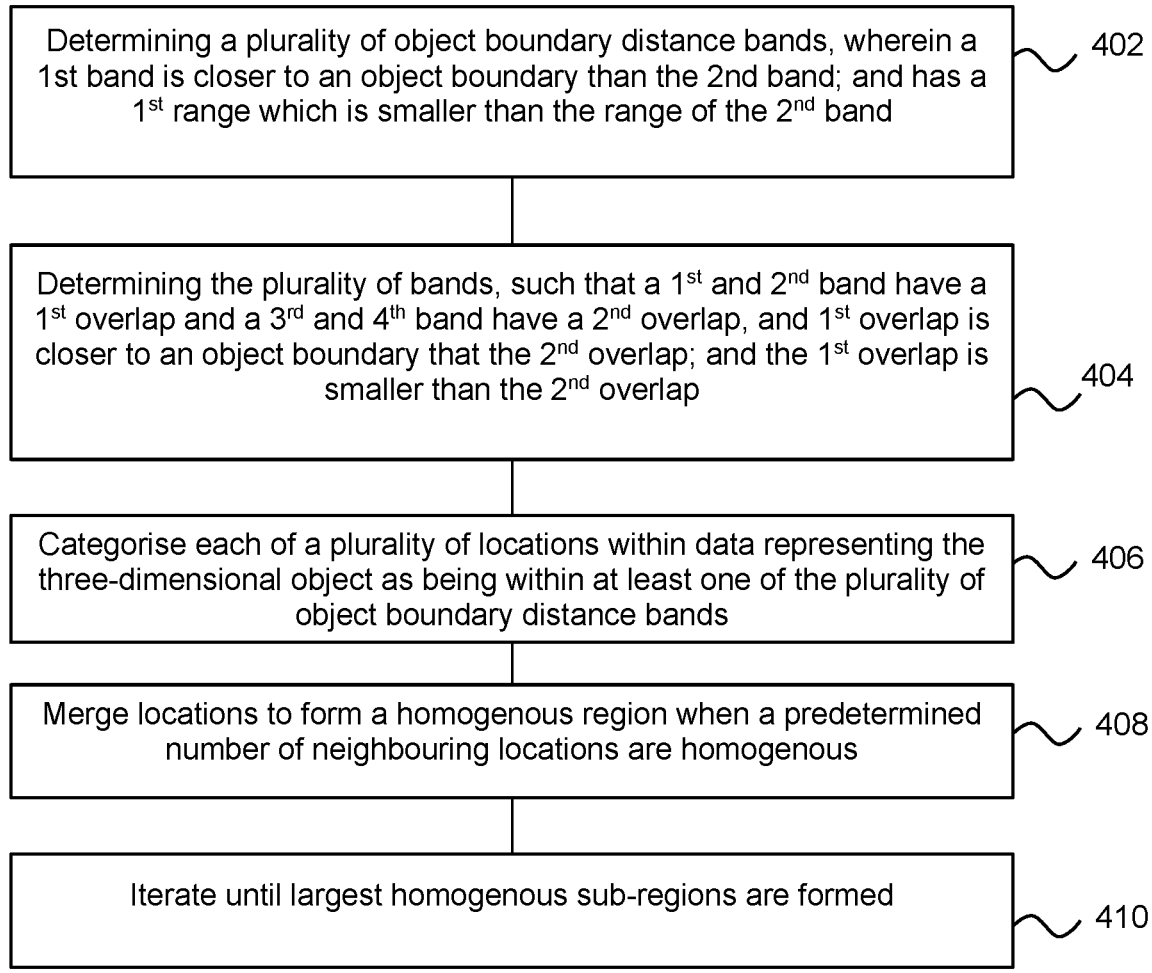
FIG. 4 is a flowchart of another example method of modifying data representing a three dimensional object.

FIG. 4 is an example of a method comprising, in block 402, determining, by a processor, at least two object boundary distance bands, wherein a first object boundary distance band spans a first range of distances to an object boundary, and a second object boundary distance band spans a second range of distances to an object boundary. The bands are determined such that the first object boundary distance band is closer to an object boundary than the second object boundary distance band, and such that the first range is smaller than the second range. As mentioned above, this may reflect that the rate of change of manufacturing parameters may decrease with increasing distance from an object boundary. Therefore, outer bands may be smaller than inner bands. Providing larger distance bands will tend to reduce the number of sub-volumes. This therefore allows larger distance bands without unduly impacting control of manufacturing parameters.

Block 404 comprises determining the plurality of object boundary distance bands, such that a first and second object boundary distance band have a first overlap and a third and fourth object boundary distance band have a second overlap. The bands are determined such that the first overlap is closer to an object boundary than the second overlap; and the first overlap is smaller than second overlap. Again, as rate of change of manufacturing parameters may decrease with increasing distance from an object boundary, the overlap region may also be more 'relaxed'. The greater the overlap, the more freedom is provided in relation to classifying locations as belonging to a band. Providing larger overlaps will tend to reduce the number of sub-volumes, and hence the size of a data representation of an object. This therefore allows overlaps without unduly impacting control of manufacturing parameters. In some examples, the second and third object boundary distance bands may be the same, and/or there may be an overlap between the second and third object boundary distance bands (which may be intermediate in size to the first and second overlap).

Block 406 comprises categorising each of a plurality of locations within data representing the three dimensional object as being within at least one of the plurality of determined object boundary distance bands. Each location may categorised based on the distance of the location from the closest object boundary. Where the location is in an overlap between bands, it may be categorised as being in either of the bands or both of the bands. Block 408 comprises merging locations to form a homogenous region when a predetermined number of neighbouring locations (for example, eight in the case of an octree representation) are homogenous with respect to a predetermined attribute and are within a common object boundary distance band of plurality of predetermined object boundary distance bands.

The process described in relation to block 408 may be iterated, merging homogenous regions when a predetermined number of neighbouring regions are homogenous. This may continue until no larger regions may be formed, at which point, in block 410, it may be determined that the homogenous sub-volumes regions are formed, and the modified data representation of the object has been determined.

In this way, a modified representation of the object may be formed, in which the object is represented in terms of sub-volumes. The modified representation may be compact (i.e. occupy a relatively small amount of memory or transmission resources) while containing object boundary distance information. The modified representation may be stored, or transmitted. In some examples, the modified representation may be used to generate control data for additive manufacturing. In some examples, a method may comprise manufacturing an object according to such control data.

Figure 5:
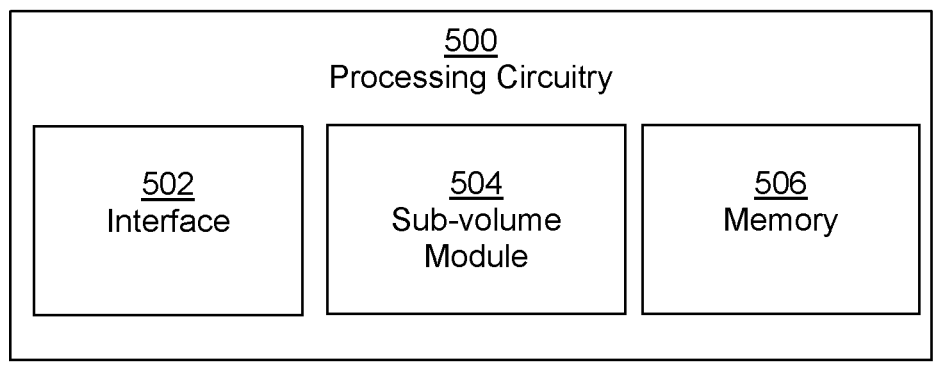
FIG. 5 is an example processing apparatus.

FIG. 5 is an example of a processing apparatus 500 comprising an interface 502, a sub-volume module 504 and, in this example, a memory 506.

The interface 502 receives a first data model representing an object and a plurality of predetermined object boundary distance bands, wherein at least two of said object boundary distance bands partially overlap. In some examples, at least one of the object boundary distance bands does not overlap with another object boundary distance band, for example to achieve a particular intended result when the object is generated. The sub-volume module 504 is operable to assign locations in the object to a sub-volume of the object such that each sub-volume is homogenous with respect to a predetermined object attribute and consists of locations which are within a common object boundary distance band. In particular, where a location is within an overlap between the object boundary distance bands, the sub-volume module 504 is to assign the location to an applicable object boundary distance band (i.e. an object boundary distance band which extends across an overlap region) which reduces the number of defined sub-volumes. As has been discussed above, this results in a compact representation of the object, which may therefore occupy less storage resources (for example, less computer memory such as the memory 506) than alternative representations while including object boundary distance information. In some examples, the sub-volume module 504 is to assign the location within an overlap to an object boundary distance band which minimises the number of sub-volumes. The sub-volume module 504 may also be operable to assign the location within an overlap to an object boundary distance band which increases the size of the defined sub-volumes. The increase in size is relative to a size of sub-volume which would be formed if the location was categorised as being in the other applicable object boundary distance band.

In some examples, the sub-volume module 504 is to form sub-volumes by iteratively merging object regions when a predetermined number of neighbouring object regions are homogenous with respect to a predetermined attribute and are within a common object boundary distance band of plurality of predetermined object boundary distance bands. In some examples, the data may be processed by maintaining an association between locations as defined at their smallest resolution and each band to which it may belong. It is only on formation of a final sub-volume (which may in some cases represent the optimal solution, in terms of minimising the number of sub-volumes formed) that the locations are associated with just one object boundary distance band.

The memory 506 in this example is operable to store a second data model representing the object as a plurality of the sub-volumes having assigned locations. In other examples such a second data model may be stored remotely, for example being transmitted over a network or the like, or may be stored in some other way.

Figure 6:
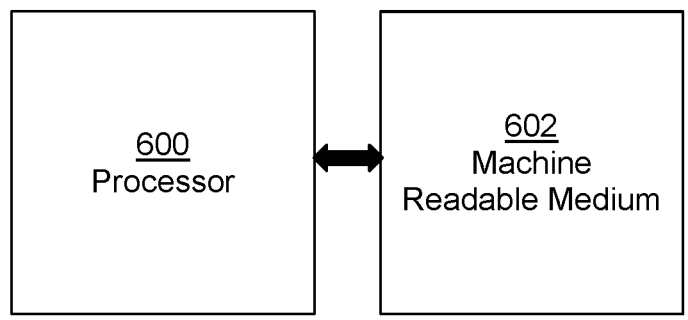
FIG. 6 is an example of a machine readable medium in association with a processor.

FIG. 6 is a representation of a processor 600 in association with in tangible (non-transitory) machine readable medium 602. The machine readable medium 602 comprises instructions which, when executed by a processor, cause the processor to:

categorise each of a plurality of locations within a three dimensional object model as being within one of plurality of predetermined object boundary distance bands, wherein at least two of said object boundary distance bands partially overlap, wherein, where a location is within an overlap between object boundary distance bands, the instructions are to categorise the location to an object boundary distance band of the overlapping object boundary distance bands in order to increase the size of at least one homogenous sub-volume, wherein the homogenous sub-volume is homogenous with respect to the object boundary distance band of the locations therein, and with respect to at least one other object attribute associated with the locations therein. The increase in size is relative to a size of sub-volume which would be formed if the location was categorised as being in the other applicable object boundary distance band.

In some examples, the machine readable medium 602 further comprises instructions which, when executed by the processor 600, cause the processor 600 to, where a location is within an overlap between object boundary distance bands, categorise the location to an object boundary distance band in order to reduce the total number of homogenous sub-volumes which represent a three dimensional object represented by the three dimensional object model.

In some examples, the machine readable medium 602 further comprises instructions which, when executed by the processor 600, cause the processor 600 to iteratively merge object regions when a predetermined number of neighbouring object regions are homogenous with respect to a predetermined attribute and are within a common object boundary distance band of plurality of predetermined object boundary distance bands.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted, and at least some processes may be carried out in parallel. Blocks described in relation to one flow chart may be combined with those of another flow chart. It shall be understood that at least some flows in the flow chart, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules (for example, the sub-volume module 504) of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, programmable gate array, etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, at a processor, data representing a three dimensional object;
   determining, using the processor, a modified data representation of the three dimensional object wherein, in the modified data representation, the three dimensional object is represented in terms of homogenous sub-volumes wherein:
   each homogenous sub-volume is homogenous with respect to a predetermined attribute; and
   each homogenous sub-volume contains locations which are within a common object boundary distance band of plurality of object boundary distance bands, wherein at least two object boundary distance bands partially overlap; and
   the homogenous sub-volumes are defined by merging locations into each homogenous sub-volume when a predetermined number of neighbouring locations are homogenous with respect to the predetermined attribute and are within a common object boundary distance band of the plurality of object boundary distance bands.

2. A method according to claim 1 wherein determining the modified data representation comprises categorising each of a plurality of locations within the data representing the three dimensional object as being within one of a plurality of predetermined object boundary distance bands,
   wherein, where a location is within an overlap between object boundary distance bands, said categorising comprises categorising the location to an object boundary distance band in order to increase a size of at least one homogenous sub-volume.

3. A method according to claim 1 wherein determining the modified data representation comprises categorising each of a plurality of locations within the data representing the three dimensional object as being within one of a plurality of predetermined object boundary distance bands,
   wherein, where a location is within an overlap between object boundary distance bands, said categorising comprises categorising the location to an object boundary distance band in order to reduce the number of homogenous sub-volumes within the three dimensional object.

4. A method according to claim 1 comprising:
   determining, by the processor, at least two object boundary distance bands, wherein a first object boundary distance band spans a first range of distances to an object boundary, and a second object boundary distance band spans a second range of distances to an object boundary, wherein:
   the first object boundary distance band is closer to an object boundary than the second object boundary distance band; and
   the first range is smaller than the second range.

5. A method according to claim 1 comprising:
   determining, by the processor, a plurality of object boundary distance bands, wherein a first and second object boundary distance band have a first overlap and a third and fourth object boundary distance band have a second overlap, wherein:
   the first overlap is closer to an object boundary than the second overlap; and
   the first overlap is smaller than the second overlap.

6. A method according to claim 1 wherein determining the modified data representation comprises categorising each of a plurality of locations within the data representing the three dimensional object as being within one of the plurality of object boundary distance bands.

7. A method according to claim 6 further comprising, by the processor, iteratively merging homogenous regions so as to form the homogenous sub-volumes when a predetermined number of neighbouring regions are homogenous with respect to a predetermined attribute and are within a common object boundary distance band of plurality of predetermined object boundary distance bands.

8. The method of claim 1, wherein the predetermined attribute is one of color, texture, transparency, conductivity, strength and porosity.

9. Processing apparatus comprising:
   an interface to receive a first data model representing an object and a plurality of object boundary distance bands, wherein at least two said object boundary distance bands partially overlap; and
   a sub-volume module to assign locations in the object to a sub-volume of the object such that each sub-volume is homogenous with respect to a predetermined object attribute and consists of locations which are within a common object boundary distance band, wherein,
   where a location is within an overlap between the object boundary distance bands, the sub-volume module is to assign the location to an object boundary distance band which reduces a number of defined sub-volumes.

10. Processing apparatus according to claim 9 wherein the sub-volume module is to form sub-volumes by iteratively merging object regions when a predetermined number of neighbouring object regions are homogenous with respect to a predetermined attribute and are within a common object boundary distance band of plurality of predetermined object boundary distance bands.

11. Processing apparatus according to claim 9 wherein the sub-volume module is to assign the location within an overlap to an object boundary distance band in order to achieve at least one of:
   an increase in size of the defined sub-volumes; and
   minimisation of a number of sub-volumes.

12. Processing apparatus according to claim 9 wherein the interface is to receive the plurality of object boundary distance bands and wherein at least one said object boundary distance bands does not overlap with another object boundary distance band.

13. Processing apparatus according to claim 9 further comprising a memory to store a second data model representing the object as a plurality of the sub-volumes having assigned locations.

14. The apparatus of claim 9, wherein the predetermined object attribute is one of color, texture, transparency, conductivity, strength and porosity.

15. The apparatus of claim 9, wherein each object boundary distance bands comprises all object regions within a predetermined depth range from a surface of the object.

16. The apparatus of claim 15, wherein successive object boundary distance bands are increasingly larger with distance from the surface of the object.

17. The apparatus of claim 15, wherein an overlap between successive object boundary distance bands is larger with distance from the surface of the object.

18. A tangible, non-transitory machine readable medium comprising instructions which, when executed by a processor, cause the processor to:
categorise each of a plurality of locations within a three dimensional object model as being within one of plurality of predetermined object boundary distance bands, wherein at least two of the predetermined object boundary distance bands partially overlap,
wherein, where a location is within an overlap between object boundary distance bands, the instructions are to categorise the location to an object boundary distance band in order to increase a size of at least one homogenous sub-volume, wherein the homogenous sub-volume is homogenous with respect to the object boundary distance band of the locations therein, and with respect to at least one other object attribute associated with the locations therein.

19. A tangible machine readable medium according to claim 18 further comprising instructions which, when executed by a processor, cause the processor to:
where a location is within an overlap between object boundary distance bands, the instructions are to categorise the location to an object boundary distance band in order to reduce a total number of homogenous sub-volumes which represent a three dimensional object represented by the three dimensional object model.

20. A tangible machine readable medium according to claim 18 further comprising instructions which, when executed by a processor, cause the processor to:
iteratively merge object regions when a predetermined number of neighbouring object regions are homogenous with respect to a predetermined attribute and are within a common object boundary distance band of plurality of predetermined object boundary distance bands.

* * * * *